United States Patent [19]

Freeman et al.

[11] 4,049,514
[45] Sept. 20, 1977

[54] ZINC HYDROMETALLURGICAL PROCESS

[75] Inventors: George M. Freeman; John E. Dulson, both of Timmins; Monica F. Morris, Richmond, all of Canada

[73] Assignee: Texasgulf Canada Ltd., Stamford, Conn.

[21] Appl. No.: 686,064

[22] Filed: May 13, 1976

[30] Foreign Application Priority Data

Mar. 11, 1976  Canada .................................. 247665

[51] Int. Cl.² .......................... C25C 1/16; C22B 3/00
[52] U.S. Cl. ..................................... 204/119; 75/108; 75/109; 75/119; 423/43
[58] Field of Search ........................ 75/119, 109, 108; 423/43, 87; 204/119

[56] References Cited

U.S. PATENT DOCUMENTS

| 2,509,916 | 5/1950 | Griffith et al. | 204/119 |
| 2,509,917 | 5/1950 | Griffith et al. | 204/119 |

Primary Examiner—R. L. Andrews
Attorney, Agent, or Firm—Kenyon & Kenyon, Reilly, Carr & Chapin

[57] ABSTRACT

Hydrometallurgical process for the recovery of copper arsenate from zinc plant cement copper residues and the use thereof in the purification of zinc electrolyte, with the attendant upgrading of the copper value in the treated cement copper residues.

19 Claims, 1 Drawing Figure

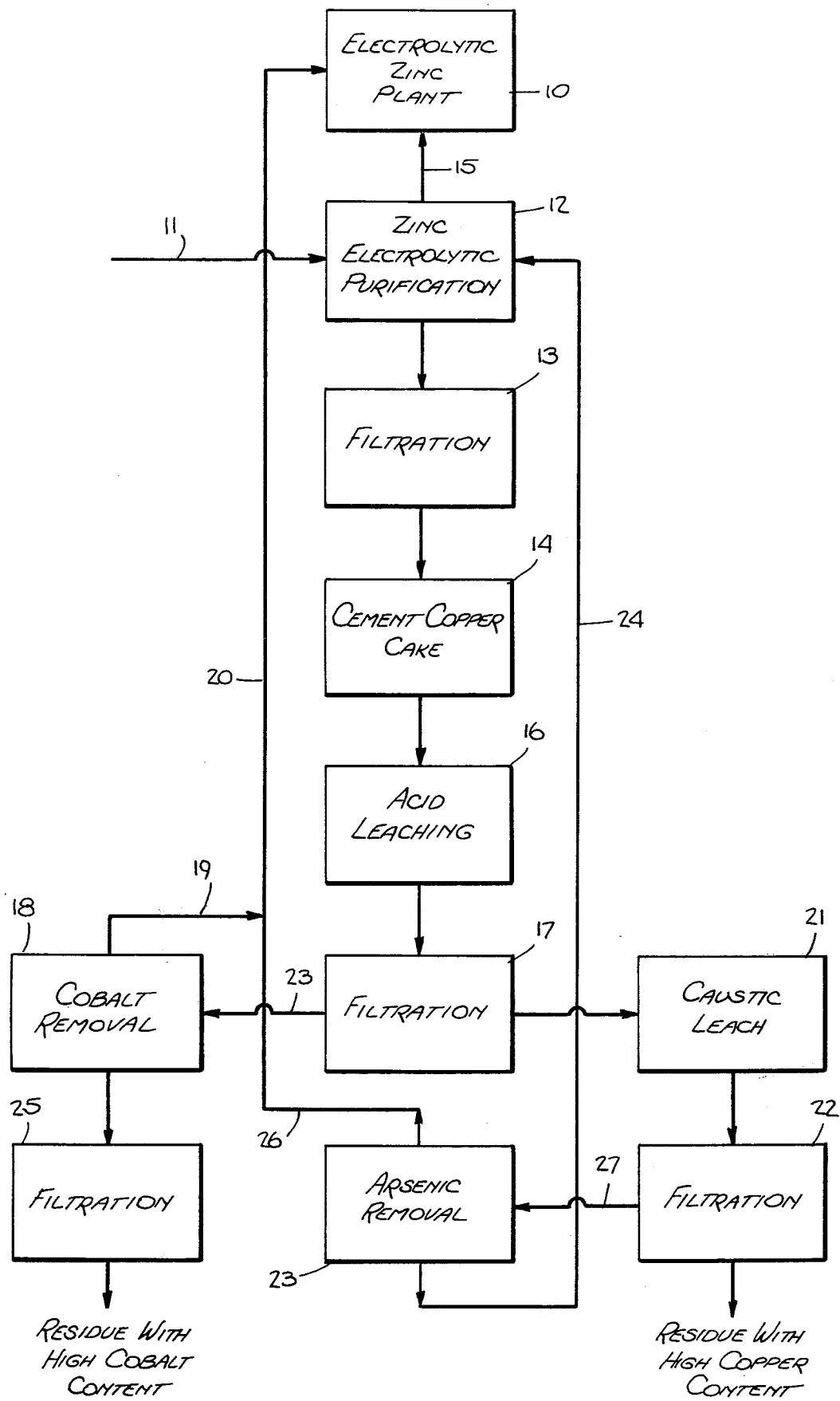

ZINC HYDROMETALLURGICAL PROCESS

Zinc is the twenty-fourth most abundant element in the earth's crust and finds many industrial applications, the most important being the oxidation-resistant treatment of iron surfaces, and others being in various fields, including topical medicines, chemical reagents, etc.

Zinc is not found in the metallic state in nature. Its chief ore is zinc blend or sphalerite (ZnS) which is the source of ninety percent of the zinc produced today. The zinc production methods employed today have heavy treatment costs and consequently zinc metal producers demand high-grade concentrates.

There are two main methods of zinc recovery from its ores, i.e., thermal reduction and electrolytic deposition, the latter requiring the availability of relatively inexpensive electrical power in view of the fact that the production of one ton of zinc requires approximately 4500 kilowatt-hours. The purest zinc (99.99%) is achieved by the electrolytic methods.

The current world production of zinc is about 3,800,000 metric tons per year, 47% by electrolytic methods and the balance by thermal methods.

The thermal methods involve the following general reactions:

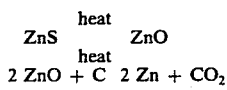

$$ZnS \xrightarrow{heat} ZnO$$
$$2 ZnO + C \xrightarrow{heat} 2 Zn + CO_2$$

The electrolytic methods generally involve the following reactions:

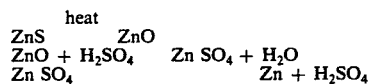

$$ZnS \xrightarrow{heat} ZnO$$
$$ZnO + H_2SO_4 \rightarrow Zn SO_4 + H_2O$$
$$Zn SO_4 \rightarrow Zn + H_2SO_4$$

Electrolytic zinc plants utilize four operations: (1) roasting of zinc sulfide concentrate; (2) leaching of the roasted concentrate or calcine to extract the soluble zinc; (3) purification of the resulting solution; and (4) electrolysis of the solution to obtain metallic zinc.

Zinc electrolyte typically contains impurities of copper, cobalt, nickel and cadmium that are detrimental to the plating of zinc and must be removed prior to electrolysis. These elements are removed by a hot copper sulfate/arsenic trioxide/zinc dust purification procedure.

The precise mechansim of the hot copper sulfate/arsenic trioxide/zinc dust purification technique is not thoroughly understood. However, a plausible explanation is as follows: Zinc dust displaces copper and arsenic from solutions which are thought to precipitate as a metallic couple. Zinc dust ordinarily does not displace cobalt and nickel from solution, but in the presence of the copper/arsenic couple such metals are quantitatively precipitated. The above copper sulfate addition may not be necessary if sufficient copper is already present in the impure zinc electrolyte.

The byproduct of the purification procedure is a cement copper cake residue containing, in addition to copper, varying amounts of zinc, cadmium, cobalt, nickel and arsenic. The market value of such cake is primarily dependent on the percentage of copper contained therein.

There are several disadvantages to the above described purification procedure.

1. The process requires the addition of arsenic trioxide and possibly copper sulfate, which affects the economics of the overall process.
2. The cement copper cake residue, because of its arsenic content, has a greatly reduced market value.
3. The zinc, cadmium and cobalt values in the cement copper cake are not reflected in the marketable value of the latter and consequently reflect losses in the overall process economics.

The present invention relates to the electrolytic production of zinc metal and involves the treatment of residue from such production processes to provide copper arsenate to be recycled for use in the preliminary purification of the zinc electrolyte, and simultaneously to upgrade the copper and reduce the arsenic content in the treated residue to increase the market value thereof and thereby process economics.

Upgrading of cement copper cake and recovery of arsenic is accomplished in four basic operations: (1) Acid leaching; (2) cobalt removal; (3) caustic leach; and (4) arsenic removal. The acid leach is conducted under optimum conditions for the dissolution of zinc, cadmium and cobalt while at the same time suppressing copper extraction. The solution and residue of the acid leach are separated by filtration for further processing. In order to make a zinc/cadmium solution suitable for recycle to the zinc plant, cobalt is removed from the acid leach solution. The copper and arsenic containing residue from the acid leach is subjected to a caustic leach to dissolve the arsenic. The caustic leach slurry is then filtered. This leaves a residue containing 60 to 80 percent copper and less than 1 percent arsenic providing an improved marketable product an improved marketable product for its copper values.

Arsenic is removed from the caustic leach solution by precipitation as copper arsenate which is used as a substitute for arsenic trioxide and copper sulfate in the first stage purification of zinc electrolyte.

The drawing is a schematic flow diagram of the overall process of the invention.

As can be seen in reference to the drawing, showing the process of the present invention in schematic form, the process involves the electrolytic refining of zinc in zinc plant 10. Not shown in the drawing is the preliminary processing of the zinc ore which is conventional. The zinc sulfate ore is in accordance with known procedures roasted to form zinc oxide, then leached with sulfuric acid to form zinc sulfate. The zinc sulfate leach solution also includes impurities that must be removed prior to electrolysis in order to avoid contamination of the final zinc product. The impure feed solution typically contains 0.5 – 1.0 grams per liter copper, 20–30 parts per million cobalt, 1–2 parts per million nickel and in addition may also contain cadmium.

The inpure feed solution 11 is fed to the zinc electrolyte purification section 12 where it is treated in accordance with the present invention with zinc dust and copper arsenate as described in more detail below in order to precipitate the aforementioned contaminating impurities using the cobalt level in the solution as a control. The final cobalt level must be less than 0.1 parts per million in order to ensure sufficient purity of the electrolyte for the electrolysis step.

The residue from the purification step 12 is separated by any conventional means such as filtration at 13 and constitutes what is known as cement copper cake 14 which typically contains the following composition:

| | |
|---|---|
| 43.4% | copper |
| 6.64% | zinc |
| 1.89% | cadmium |
| 1.25% | cobalt |
| 0.05% | nickel |
| 6.89% | arsenic |

The purified zinc electrolyte filtrate is delivered through line 15 to the electrolytic zinc plant 10 for electrolysis. The cement copper cake 14 is treated in order to (a) upgrade the copper content and purity of the residue to increase the market value thereof and (b) to recover the arsenic content and convert the latter to copper arsenate and recycle the copper arsenate to the purification step 12 and use it in conjunction with zinc dust for the previously described precipitation step in place of the prior art copper sulfate/arsenic trioxide reagents.

The cement copper cake 14 is subjected to an acid leaching step 16 in order to recover zinc, cadmium and cobalt constituents therefrom as a filtrate and provide a residue separated by filters 17. The filtrate is delivered to the cobalt removal stage 18 to separate the cobalt therefrom so that the remaining zinc/cadmium solution can be delivered through line 19 to recycle line 20 through which it is delivered to the electrolytic zinc plant 10 for reuse. The residue from cobalt removal stage 18 has a high cobalt content which has market value.

The residue from filtration step 17 is subjected to a caustic leach 21 to dissolve the arsenic and leave a high copper residue which is separated in filtration step 22. The latter residue, designated as the treated cement copper cake, has an enhanced copper content which increases its market value. The filtrate from step 22 is treated with copper sulfate in arsenic removal stage 22 to provide copper arsenate which may be recycled through return line 24 to the electrolytic purification step previously described. The remaining zinc containing solution is delivered to recycle line 20 for delivery to the electrolytic zinc plant 10.

Acid Leaching

Temperature of the acid leach slurry in step 16 is maintained at about 95° C with 20 percent initial solids loading and 15 to 20 grams per liter initial sulfuric acid addition. After about 2 hours, the acid leach slurry is neutralized to pH 3.5 to 4.0 with sodium hydroxide to precipitate any leached copper. The quantity of sodium hydroxide used in this step varies with different copper cake samples, and so also does the final pH. However, control is easily maintained by observing the color of the leach solution. Copper precipitation is complete when the solution loses its blue color. Consumption of sodium hydroxide is generally 75 to 150 pounds per dry ton of copper cake. Fresh copper cake consumes more sodium hydroxide than stockpiled copper cake. It should be noted that some degree of attritioning to break up lumps is necessary either before or during the acid leaching of stockpiled copper cake. Attrition is not needed for fresh cake.

The acid leach slurry is filtered at 17 and the arsenic rich residue displacement washed. The residue is black and finely divided. It is amenable to filtration by filter press, and behaves similarly to regular copper cake.

Typical products of the acid leach, based on an average sample of copper cake assaying 6.24% Zn, 1.89% Cd, 1.25% Co, 0.71% Mn, 43.4% Cu, 6.89% As, 0.10% Na and 15.5% $SO_4$, having the following analysis:

TABLE I

Results of Acid Leach Extractions

Stockpiled Cake

| Component | Filtrate (grams/liter) | Residue % | Recovery (as % metal value in feed) |
|---|---|---|---|
| Zn | 11.8 | 2.16 | 71.4 |
| Cd | 3.95 | 0.46 | 81.9 |
| Co | 2.77 | 0.22 | 87.0 |
| Mn | 1.71 | 0.05 | 94.3 |
| Cu | 0.22 | 57.8 | 0.20 |
| As | 1.99 | 8.14 | 11.4 |
| Na | 6.52 | 0.13 | 96.4 |
| $SO_4$ | 42.2 | 6.81 | 76.4 |

Fresh Cake

| Component | Filtrate (grams/liter) | Residue % | Recovery (as % metal value in feed*) |
|---|---|---|---|
| Zn | 13.6 | 1.21 | 85.5 |
| Cd | 3.27 | 0.84 | 67.9 |
| Co | 1.87 | 0.70 | 58.8 |
| Mn | 1.76 | 0.03 | 97.0 |
| Cu | 55 ppm | 57.9 | 0.05 |
| As | 1.68 | 8.30 | 9.62 |
| Na | 11.5 | 0.32 | 94.5 |
| $SO_4$ | N/A | N/A | N/A |

*Copper cake plus added reagents.

Cobalt Removal

Cobalt removal is carried out at 18 under the following conditions. Filtrate 23 from the acid leach process stage 16 is heated to about 95° C and solid potassium permanganate is added until a slight excess of permanganate is noted, as seen by a deep purple color. Sodium hydroxide is then added in an amount sufficient to maintain pH of the resulting slurry at about 3.0 to 3.5. These conditions are maintained for about two hours. Total cobalt removal may be accomplished by using a longer reaction time but is not mandatory in this process. The slurry is filtered at 25 and the residue displacement washed.

Average reagent consumption per pound of cobalt removed is 3.8 pounds of potassium permanganate and 2.0 pounds of sodium hydroxide. These figures constitute a considerable excess over the theoretical requirement. The reason for this is that potassium permanganate is consumed in oxidizing manganese and arsenic in addition to cobalt in the acid leach solution.

Typical products of the cobalt removal stage obtained from as typical acid leach solution analyze as shown below in Table II. The filtrate is returnable to the zinc plant for recovery of zinc and cadmium. The amount of zinc and cadmium reporting to the cobalt rich residue is largely dependent on washing efficiency. This residue requires a thorough displacement wash to remove zinc and cadmium.

TABLE II

Results of Cobalt Removal

| Component | Filtrate (grams/liter) | Residue % | Recovery (as % metal value in feed*) |
|---|---|---|---|
| Zn | 11.0 | 2.45 | 5 |
| Cd | 3.48 | 1.64 | 10 |
| Co | less than 5 ppm | 11.5 | 100 |
| Mn | less than 5 ppm | 22.4 | 100 |
| Cu | 0.11 | 0.45 | 50 |
| As | 0.20 | 7.45 | 90 |
| Na | 9.11 | 2.03 | 5 |

*Solution from acid leach stage plus added reagents.

Caustic Leach

The residue of high arsenic content from the acid leach process stage 16 is leached with caustic at 21 to dissolve the arsenic. Temperature of the caustic leach slurry is maintained at about 95° C with 10% initial loading of residue from the acid leach stage and addition of 5% sodium hydroxide solution. Air is continuously added to slurry at the rate of approximately 500 standard cubic feet per minute per dry ton of acid leach residue. These reaction conditions are maintained for about 6 hours. The slurry is then filtered at 22 and the residue displacement washed. The residue is usually brown or green and is slower filtering than other residues in this process.

Typical products of the caustic leach stage obtained from the feed to this stage analyze as follows:

TABLE III

Results of Caustic Leach

| Component | Filtrate (grams/liter) | Residue % | Recovery (as % metal value in feed*) |
|---|---|---|---|
| Zn | 0.51 | 2.07 | 21.4 |
| Cd | less than 1 ppm | 0.56 | 0 |
| Co | less than 1 ppm | 0.26 | 0 |
| Mn | less than 1 ppm | 0.07 | 0 |
| Cu | less than 60 ppm | 70.4 | less than 0.1 |
| As | 8.29 | 0.75 | 92.4 |
| Na | 28.0 | 0.32 | 99.0 |
| SO$_4$ | 7.16 | 0.42 | 95.0 |

*Residue from acid leach stage plus added reagents.

Many other caustic leaches using slightly different conditions also extract more than 90% of the arsenic.

Arsenic Removal

Arsenic is removed from the caustic leach solution as an insoluble solid at 23. The purified solution 26 is returnable to the zinc plant. In the preferred embodiment, the following conditions are used. The filtrate 27 from the caustic leach stage is heated to 75°-80° C. Because formation of copper arsenate is not complete if copper sulfate is added directly to the solution, sufficient sulfuric acid is first added to bring the solution to about pH 8. Copper sulfate is then added; about 60 pounds of $CuSO_4 \cdot 5H_2O$ per water ton of solution is required. The amount of copper sulfate required may vary depending on the arsenic content of the solution. The resulting slurry is maintained for about 2 hours. A small amount of lime, usually about 3 pounds per water ton, is then added to ensure a final pH above 4. The slurry is then filtered. Arsenic removal is usually greater than 95% by this method. The filtrate is returnable to the zinc plant. The residue, a pale blue quick filtering solid, is returnable through line 24 for use as a substitute for arsenic trioxide and copper sulfate in first stage purification of zinc electrolyte. Typical products of the arsenic removal stage obtained from the feed to this stage analyze as follows:

TABLE IV

Results of Arsenic Removal

| Component | Filtrate (grams/liter) | Residue % | Recovery (as % metal value in feed*) |
|---|---|---|---|
| Zn | 0.12 | 1.30 | 75.0 |
| Cd | 1 ppm | 10 ppm | — |
| Co | 1 ppm | 10 ppm | — |
| Mn | 1 ppm | 10 ppm | — |
| Cu | 0.32 | 24.6 | 95.7 |
| As | 0.18 | 27.6 | 97.7 |
| Na | 25.9 | 4.33 | 4.54 |
| Ca | 0.5 | 2.33 | 56.0 |

*Solution from caustic leach stage plus added reagents.

Electrolyte Purification

The copper arsenate product from the arsenic removal stage 23 is used as as a substitute for copper sulfate and arsenic trioxide in the removal of copper, cobalt and nickel from impure zinc electrolyte at stage 12. Impure zinc electrolyte solution typically contains 0.5–1.0 grams/liter copper, 20–30 parts per million cobalt, and 1–2 parts per million nickel. Electrolyte purification is performed as follows: 1.5 to 2.5 grams/liter of zinc dust and 0.25 grams (dry)/liter of copper arsenate product are added to impure zinc electrolyte solution at about 80 to 90° C. The temperature is then maintained at about 90 to 95° C until the cobalt level in the solution is less than 0.1 ppm. When this cobalt level is reached, the pH of the solution is adjusted to approximately pH 4 and the slurry is then filtered. Total reaction time is usually about 2 hours. The filtrate is fed to the zinc plant for electrolytic recovery of metallic zinc. The cement copper cake residue is treated according to the present invention to remove and recycle its arsenic content, with attendant upgrading of the copper cake.

EXAMPLE 1

Six plant runs were made using the electrolyte purification process of the present invention. Impure zinc electrolyte solution of pH about 4 and at about 80°-90° C was treated with 1.5 to 2.5 grams/liter of zinc dust and 0.25 grams (dry)/liter of copper arsenate product from the arsenic removal stage. The temperature was maintained at about 90° to 95° C until the cobalt level in the solution was less than 0.1 ppm. The results are summarized below:

TABLE V

Results of Use of Copper Arsenate Product In Removal of Cobalt from Impure Zinc Electrolyte Batch Size: 36,000 gallons

| Run No. | Initial Cobalt Level In Impure Feed | Amount of Zinc Dust Added | Amount of Copper Arsenate Product Added (55% moisture) | Time Taken For Cobalt To Reach Less Than 0.1 ppm |
|---|---|---|---|---|
| 1 | 16 ppm | 550 pounds | 160 pounds | 85 minutes |
| 2 | 17 | 650 | 160 | 110 |
| 3 | 19 | 650 | 160 | 90 |
| 4 | 19 | 650 | 172 | 41 |
| 5 | 19 | 650 | 172 | 80 |
| 6 | 19 | 650 | 172 | 115 |

The laboratory procedure differs somewhat from the plant procedure. It was found that on a small (1 liter) scale the reagent requirements are greater and the purification is more difficult to control. The following example illustrates the laboratory procedure:

EXAMPLE 2

Four 1 liter samples of impure zinc electrolyte containing 16 ppm Co were treated with copper arsenate and zinc dust in the following way. The samples were heated to 90° C in beakers; 1 g dry powdered copper arsenate product was added to each beaker together with 2, 3, 4 and 5 g, respectively, of zinc dust. The beakers were stirred for 1 hour, and solution samples were removed from each at 10 minute intervals. The solutions treated with 2 and 3 g of zinc dust did not achieve the required cobalt level of less than 0.1 ppm. In those treated with 4 and 5 g of zinc dust the cobalt level fell to less than 0.1 ppm after 20 minutes.

It is thought that performance on a plant scale is more effective than on a bench scale because the reducing conditions required for the purification are more easily maintained in a large tank than in a 1 liter beaker.

As can be seen from the above description, according to the present invention a copper arsenate product is made from cement copper cake residue and reused in purification of zinc electrolyte. Two superior features of this invention are:

1. Arsenic is recycled; therefore only a small makeup of supply of arsenic trioxide is required; and
2. The cement copper residue is considerably upgraded during treatment, the final residue containing more than 70% copper and less than 1% arsenic.

The copper arsenate product is derived from zinc plant cement copper residue in a four stage process comprising:

1. An acid leach in which about 74% of the zinc, 82% of the cadmium and 87% of the cobalt are extracted.
2. A cobalt removal stage in which cobalt is precipitated from the acid leach filtrate leaving a zinc/cadmium solution suitable for recycle to the zinc plant.
3. A hot aerated caustic leach in which over 90% of the arsenic is extracted from the acid leach residue.
4. An arsenic removal stage in which arsenic is precipitated as copper arsenate from the caustic leach filtrate, again leaving a solution which is returnable to the zinc plant. Expected benefits from the present invention include:

1. Reduced expenditure for arsenic trioxide as a purification reagent.
2. Reduced dependence on outside sources for supply of arsenic trioxide.
3. Increased value of upgraded copper residue.

While one embodiment of the present invention has been shown and described herein, it is to be understood that certain changes and/or additions may be made thereto by those skilled in the art without departing from the scope and spirit of the invention.

What is claimed is:

1. In a process for electrowinning zinc metal wherein copper, cadmium and cobalt contaminants are removed from the impure electrolyte prior to electrolysis, including the formation of a cement copper cake residue fraction, the improvement comprising:
   a. subjecting said cement copper cake to an acid leach followed by an alkali addition to extract substantial amounts of zinc, cadmium and coablt in solution and provide a copper-enriched residue;
   b. precipitating cobalt from the extraction solution of step (a);
   c. separating the precipitated cobalt from the solution in step (b);
   d. subjecting said copper-enriched residue of step (a) to a caustic leach to extract arsenic in solution therefrom and provide a copper-enriched cement copper cake product;
   e. reacting the arsenic-containing solution from step (d) with a copper salt to form copper arsenate residue and leave a zinc-containing solution;
   f. treating said impure electrolyte with said copper arsenate residue to remove said contaminants.

2. In the process of claim 1, recycling the separated solution of step (c) and the zinc-containing solution of step (e) to the purified electrolyte to be subjected to electrolysis.

3. In the process of claim 2, said acid leach being carried out with sulfuric acid at about 95° C for about two hours followed by neutralization with sodium hydroxide to a pH of from about 3.5 to 4.0.

4. In the process of claim 3, step (b) including the heating of said extraction solution to about 95° C, adding solid potassium permanganate until a slight excess is indicated by a deep purple color, then adding sodium hydroxide to adjust the pH of the solution to about 3.0 to 3.5, maintaining such conditions for about two hours, then removing cobalt as residue.

5. In the process of claim 4, step (d) including addition of sodium hydroxide, maintaining the temperature at about 95° C, and aerating the mixture, for about six hours, then separating an arsenic-rich solution and a copper-enriched cement including copper cake product.

6. In the process of claim 5, step (e) including heating said arsenic-containing solution to about 75–80° C, adjusting the pH to about 8.0 with sulfuric acid, adding copper sulfate followed by the addition of lime to ensure a final pH of above 4.0, then separating the copper arsenate residue therefrom.

7. A process for recovery of arsenic from cement copper cake which comprises the steps of:
   a. leaching cement copper cake with hot acid to form a slurry and thereafter neutralizing said slurry to a pH of about 3.5 to 4.0;
   b. dividing said slurry into its solution and residue fractions;
   c. caustic leaching the residue fraction from step (b) to form a slurry;
   d. dividing the slurry from step (c) into its solution and residue fractions;
   e. treating the solution fraction from step (d) to remove arsenic as copper arsenate.

8. The process of claim 7 wherein the acid comprises sulfuric acid.

9. The process of claim 8 wherein the neutralizing comprises adding sodium hydroxide.

10. The process of claim 9 wherein said solution fraction from step (b) is treated to remove cobalt.

11. The process of claim 10 wherein said treatment comprises treating said solution with potassium permanganate and sufficient sodium hydroxide to form a slurry to a pH of about 3.0 to 3.5 and thereafter dividing said slurry into its solution and residue fractions.

12. The process of claim 11 wherein said slurry is maintained at a temperature of about 95° for about two hours.

13. The process of claim 12 wherein said caustic leaching of step (c) comprises adding about five percent sodium hydroxide solution to said residue and providing continuous aeration to form a slurry.

14. The process of claim 13 wherein said slurry is maintained at a temperature of about 95° C for about 6 hours.

15. The process of claim 14 wherein step (e) comprises treating said solution with sulfuric acid to a pH of about 8.0 and thereafter adding copper sulfate to form insoluble copper arsenate and thereafter separating said copper arsenate from said slurry.

16. The product, copper arsenate produced by the process of claim 15.

17. The process of purifying zinc electrolyte prior to electrolysis thereof in the electrowinning of metallic zinc comprising maintaining said electrolyte at a temperature of about 90°-95° C, adding zinc dust in an amount of about 1.5 to 2.5 grams per liter and copper arsenate in an amount of about 0.25 grams per liter until the cobalt level of said electrolyte is less than 0.1 ppm, and adjusting the pH to about 4.0 removing the solids from said electrolyte.

18. In a process for electrowinning zinc metal wherein copper, cadmium and cobalt contaminants are removed from the impure electrolyte prior to electrolysis, including the formation of a cement copper cake residue fraction, the improvement comprising:
  a. subjecting said cement copper cake to an acid leach followed by an alkali addition to extract substantial amounts of zinc, cadmium and cobalt in solution and provide a copper-enriched residue;
  b. precipitating cobalt from the extraction solution of step (a) by the addition of potassium permanganate;
  c. separating the precipitated cobalt from the solution in step (b);
  d. subjecting said copper-enriched residue of step (a) to a caustic leach to extract arsenic in solution therefrom and provide a copper-enriched cement copper cake product;
  e. reacting the arsenic-containing solution from step (d) with a copper salt to form copper arsenate residue and leave a zinc-containing solution;
  f. treating said impure electrolyte with said copper arsenate residue to remove said contaminants.

19. A composition of matter comprised of a major amount of copper arsenate of the general chemical formula $Cu_3(AsO_4)_2 4H_2O$ and including additional precipitated materials in the ionized state analyzing by weight of the total composition approximately as follows:

| | |
|---|---|
| Zinc | 1.3% |
| Cadmium | 10 parts per million |
| Cobalt | 10 parts per million |
| Manganese | 10 parts per million |
| Sodium | 2.2% |
| Calcium | 4.3% |
| Sulfate | 8.9% |

* * * * *